(12) United States Patent
Albrecht et al.

(10) Patent No.: US 11,150,267 B2
(45) Date of Patent: Oct. 19, 2021

(54) SCANNING PROBE MICROSCOPE USING SENSOR MOLECULES TO IMPROVE PHOTO-INDUCED FORCE ON SAMPLES

(71) Applicant: MOLECULAR VISTA, INC., San Jose, CA (US)

(72) Inventors: Thomas R. Albrecht, San Jose, CA (US); Derek Nowak, San Jose, CA (US); Junghoon Jahng, San Jose, CA (US); Sung I. Park, Saratoga, CA (US); Eun Seong Lee, Daejeon (KR)

(73) Assignee: MOLECULAR VISTA, INC., San Jose, CA (US)

( * ) Notice: Subject to any disclaimer, the term of this patent is extended or adjusted under 35 U.S.C. 154(b) by 0 days.

(21) Appl. No.: 17/057,089

(22) PCT Filed: May 24, 2019

(86) PCT No.: PCT/US2019/034058
§ 371 (c)(1),
(2) Date: Nov. 19, 2020

(87) PCT Pub. No.: WO2019/227078
PCT Pub. Date: Nov. 28, 2019

(65) Prior Publication Data
US 2021/0208181 A1    Jul. 8, 2021

Related U.S. Application Data

(60) Provisional application No. 62/676,878, filed on May 25, 2018.

(51) Int. Cl.
*G01Q 60/24* (2010.01)
*G01Q 70/06* (2010.01)

(52) U.S. Cl.
CPC .............. *G01Q 60/24* (2013.01); *G01Q 70/06* (2013.01)

(58) Field of Classification Search
CPC .............................. G01Q 60/24; G01Q 70/06
(Continued)

(56) References Cited

U.S. PATENT DOCUMENTS 5,353,632 A     10/1994  Nakagawa
7,740,803 B2 *   6/2010  Sindi .................. G01N 21/1702
                                                        422/68.1
(Continued)

FOREIGN PATENT DOCUMENTS

WO      2018089022 A1    5/2018

OTHER PUBLICATIONS

International Patent Application No. PCT/US2019/034058, International Search Report and Written Opinion, 9 pages (dated Sep. 30, 2019).

*Primary Examiner* — Nicole M Ippolito
(74) *Attorney, Agent, or Firm* — Loza & Loza, LLP; Thomas H. Ham (57) ABSTRACT

A scanning probe microscope and method of operating the microscope uses a resonant material between a metallic probe tip and a surface of a sample with at least one material having a dielectric constant ε. When electromagnetic radiation from a light source is transmitted to an interface between the metallic probe tip and the sample, absorption of the electromagnetic radiation by the resonant sensor material that is dependent on the dielectric constant of the at least one material of the sample is detected.

20 Claims, 8 Drawing Sheets

(58) Field of Classification Search
USPC .......................... 850/1, 2, 3, 33, 52, 56, 57
See application file for complete search history.

(56) References Cited

U.S. PATENT DOCUMENTS

| | | | |
|---|---|---|---|
| 2004/0196037 A1* | 10/2004 | Xiang | ................... G01N 24/10 |
| | | | 324/300 |
| 2009/0249521 A1 | 10/2009 | Dazzi et al. | |
| 2010/0218286 A1 | 8/2010 | Lai et al. | |
| 2012/0223804 A1* | 9/2012 | Gaitas | ..................... H01C 7/06 |
| | | | 338/307 |
| 2013/0283487 A1* | 10/2013 | Wickramasinghe | ... G01Q 60/34 |
| | | | 850/40 |
| 2015/0308947 A1 | 10/2015 | Xu et al. | |
| 2018/0052186 A1 | 2/2018 | Su et al. | |
| 2018/0120344 A1 | 5/2018 | Prater et al. | |

* cited by examiner

M = maximum field enhancement

SCANNING PROBE MICROSCOPE USING SENSOR MOLECULES TO IMPROVE PHOTO-INDUCED FORCE ON SAMPLES

CROSS REFERENCE TO RELATED APPLICATION

This application is entitled to the benefit of U.S. Provisional Patent Application Ser. No. 62/676,878, filed on May 25, 2018, which is incorporated herein by reference.

BACKGROUND OF THE INVENTION

Photo-induced force microscopy (PiFM) utilizes a metal coated atomic force microscopy (AFM) probe tip to detect the photo-induced forces and/or force gradients acting between the AFM probe tip and a sample to measure the sample's local optical polarizability below the tip apex. An important element that determines the strength of signal is the field enhancement that results from the metal coating, shape of the probe tip, and the P polarization (electric field of the light that is mostly parallel to the tip axis) of the excitation light. The enhanced field is most intense right at the apex and quickly decays (in a matter of ~10s of nm) with increasing distance from the apex. The metal typically has a flat response to the infrared (IR) excitation source as a function of wavelength whereas the sample may have one or more pronounced responses corresponding to vibrational resonances associated with the sample's chemical makeup; somewhat less frequently, the probe tip and sample may also have more exotic resonances such as plasmon resonances. PiFM will record strong signals at those wavelengths associated with resonances. Since the wavelengths of the vibrational resonances are associated with specific molecular composition, PiFM spectra can point to local chemical composition of the sample with nm-scale spatial resolution.

Other types of nanoscale instruments that rely on the vibrational and plasmonic resonances to study the sample's chemical make-up include photo-thermal induced resonance (PTIR) where the absorption of the excitation light induces thermal expansion of the sample, which causes the change in AFM cantilever's deflection signal and scattering scanning near-field optical microscope (s-SNOM, also known as aperture less near-field optical microscope) where the scattered near-field photons from the probe tip is collected by a far-field photodetector. In all these techniques (PiFM, PTIR, and s-SNOM), the resonances in the sample are detected. Therefore, all these techniques become mostly useless with samples that are not IR active, i.e., infrared excitation does not excite the vibrational resonance. There are many important samples that are not IR active or their vibrational resonance is not accessible via the infrared laser source in use. In particular, quantum cascade laser, which produces continuously tunable IR light with good amount of power typically ranges from about 5 microns to 13 microns. Some specific examples that are not IR active in this spectral range are many 2-dimensional materials, silicon, various metals, and dielectrics such as silicon-germanium (SiGe). Many of these materials are used actively for diverse applications, and it would be good to be able to highlight them with nanoscale spatial resolution.

SUMMARY OF THE INVENTION

A scanning probe microscope and method of operating the microscope uses a resonant material between a metallic probe tip and a surface of a sample with at least one material having a dielectric constant $\varepsilon$. When electromagnetic radiation from a light source is transmitted to an interface between the metallic probe tip and the sample, absorption of the electromagnetic radiation by the resonant sensor material that is dependent on the dielectric constant of the at least one material of the sample is detected.

A scanning probe microscope in accordance with an embodiment of the invention includes a cantilever with a metallic probe tip to interface a sample with at least one material having a dielectric constant $\varepsilon$, a light source to transmit electromagnetic radiation to an interface between the metallic probe tip and the sample, a vibration drive device coupled to the cantilever that vibrates the cantilever, a resonant sensor material between the metallic probe tip and a surface of the sample, and a detection system to detect absorption of the electromagnetic radiation by the resonant sensor material, wherein the absorption of the electromagnetic radiation by the resonant sensor material is dependent on the dielectric constant $\varepsilon$ of the at least one material of the sample.

A method of operating a scanning probe microscope in accordance with an embodiment of the invention includes driving a cantilever with a metallic probe tip of the scanning probe microscope to vibrate so that the metallic probe tip interfaces a sample with at least one material having a dielectric constant $\varepsilon$, modulating a light source that irradiates an interface between the probe tip and the sample with electromagnetic radiation, wherein a resonant sensor material is located between the metallic probe tip and a surface of the sample, and detecting absorption of the electromagnetic radiation by the resonant sensor material, wherein the absorption of the electromagnetic radiation by the resonant sensor material is dependent on the dielectric constant $\varepsilon$ of the at least one material of the sample.

Other aspects and advantages of the present invention will become apparent from the following detailed description, taken in conjunction with the accompanying drawings, illustrated by way of example of the principles of the invention.

DETAILED DESCRIPTION

As mentioned above, one of the parameters that govern the strength of the photo-induced force microscopy (PiFM) signal is the local field enhancement underneath the apex of the metal atomic force microscopy (AFM) probe tip. The magnitude of the field strength will depend on how well the metal probe tip couples to the sample/substrate structure electromagnetically. For example, it is well-known for all near-field imaging tools (PTIR, s-SNOM, and PiFM), the response of a thin sample is enhanced if the sample is deposited onto a metal substrate; that is because the metal's extremely high dielectric constant will force the gap field (between the probe tip and the sample surface) to increase, and the effective field the sample sees will be much higher than for a nonmetallic substrate. The extent of the gap field enhancement is dependent on the dielectric constant of the substrate; the higher the dielectric constant, the greater the field enhancement. Therefore, if there is a thin uniform material A with a unique vibrational resonance at f1 on top of two materials (B and C) with different dielectric constants ($\varepsilon_B > \varepsilon_C$), then the PiFM signal at f1 will be stronger when it is on B. This result will be the same even if the two materials B and C were not IR active. Therefore, the materials B and C can be distinguished by covering them with a uniform film that has a vibrational resonance accessible by the laser source. While materials of different dielectric constants can be distinguished, the chemical identification will not be as clear as if the full PiFM spectrum was acquired. Even so, the ability to highlight different materials based on different dielectric constants when they do not render much information under normal IR interrogation is a useful capability. The material A can be considered as a sensor molecule material since it can be used to infer information of the actual sample consisting of materials B and C. Note that rather than coating the sample surface with a uniform layer of sensor molecules, the probe tip can instead be coated with the sensor molecule and leave the sample surface with B and C exposed. When the sample is imaged with such a tip coated with the sensor molecule material A, the effect will be the same, i.e., the PiFM signal will show a stronger response at f1 when the tip is over the material B due to its higher dielectric constant.

Figure 1:
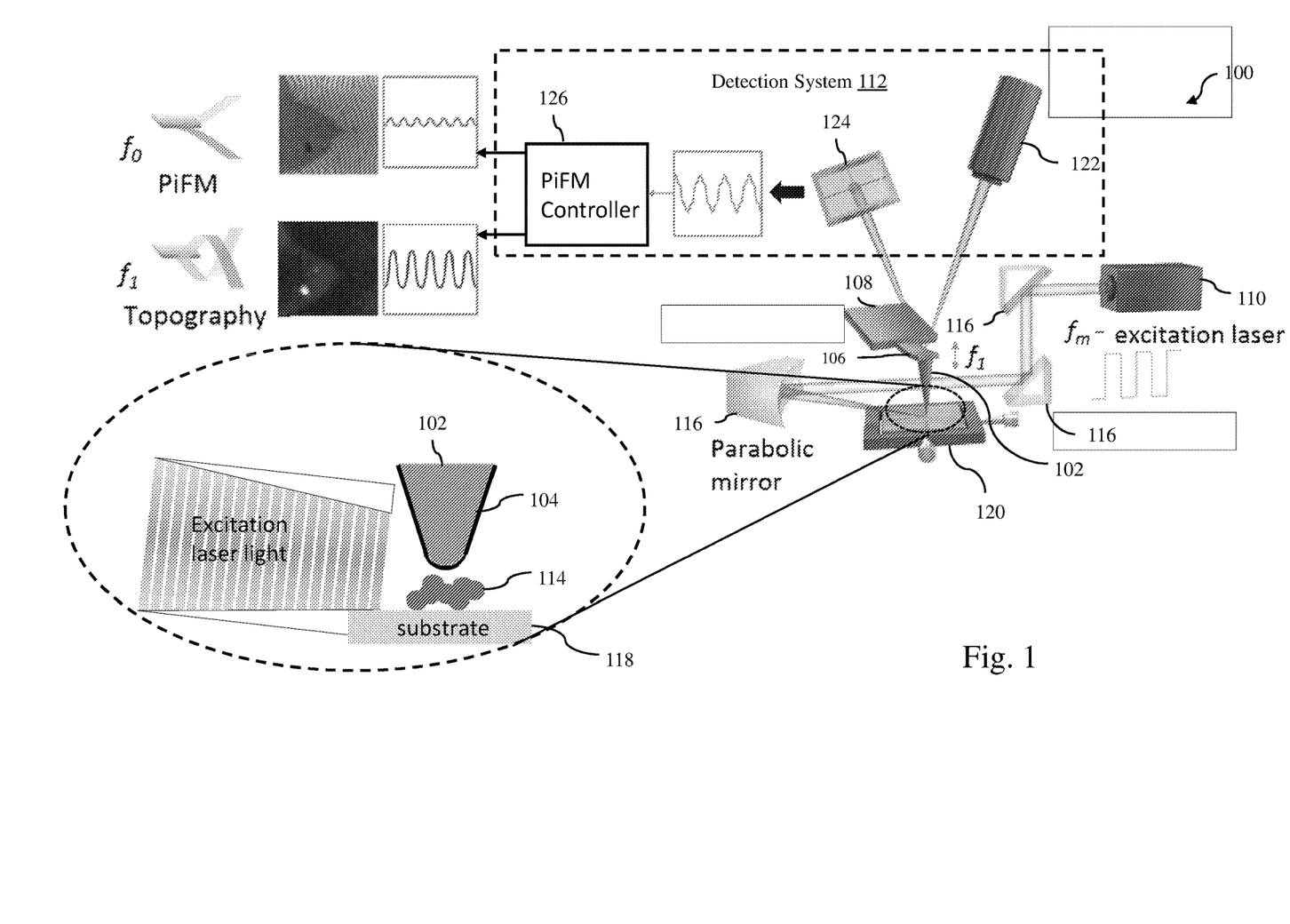
FIG. 1 is a block diagram of a scanning probe microscope in accordance with an embodiment of the invention.

FIG. 1 shows an embodiment of a scanning probe microscope 100 where a metallic AFM probe tip 102 is coated with a layer of sensor material 104. The scanning probe microscope 100 works as a photo-induced force microscope (PiFM), where one mechanical resonance of a cantilever 106 is used to track topography and another mechanical resonance is used to measure the photo-induced force or force gradient. The cantilever 106 is driven by a vibration drive device 108, e.g., a piezoelectric transducer, to vibrate the cantilever with the metallic probe tip 102 at frequency fj, and an excitation light source 110, e.g., a tunable laser 110 is modulated or pulsed at frequency fm, where fm=fi+fj or fm=fj−fi and where fi and fj are i-th and j-th mechanical resonances of the cantilever 106. FIG. 1 depicts one combination where fj=j1 and fi=fo.

Nonlinear interaction between the dither motion and the photo-induced force results in frequency mixing that generates cantilever vibration at fi. The choice of frequencies fi and fj can be made based on the bandwidth of a detection system 112, but one-method utilizes fi is the first flexural mode and fj is the second flexural mode of the cantilever; in this setup, the Van der Waals interaction is measured for topography measurement at the second flexural mode, and the side band resulting from the mixing of the photo-induced force on the Van der Waals interaction is measured on the first resonance mode of the cantilever.

As shown in FIG. 1, the electromagnetic radiation from the tunable laser 110 is directed to an interface between the metallic probe tip 102 and a sample 114, which includes at least one material having a dielectric constant ε and at least one other material having a different dielectric constant, using one or more optical elements 116, which may include a parabolic mirror to focus the electromagnetic radiation to the interface. The metallic probe tip 102 may be a solid metal tip or a metal-coated tip. The sample 114 is placed on a substrate 118 of an XYZ sample scanner, which can move the sample in X, Y and Z directions.

The detection system 112 includes an AFM feedback light source 122, e.g., a laser, a photo-detector 124 and a PiFM controller 126, which are all well-known components. The AFM feedback light source 122 and the photo-detector 124 operates to optically detect vibrations of the cantilever 106 due to photo-induced forces and/or force gradients acting between the probe tip 102 and the sample 114 and due to the Van der Waals interaction. The PiFM controller 126 includes electronics to process the signals generated by the photo-detector 124 in response to received light from the AFM feedback light source reflected off the cantilever 106. The PiFM controller 126 can detect the absorption of the electromagnetic radiation from the light source 110 by the resonant sensor material 104, which is dependent on the dielectric constants of the materials in the sample. In an embodiment, the PiFM controller 126 detects the absorption of the electromagnetic radiation by the resonant sensor material 104 by measuring photo-induced forces or force gradients acting on the probe tip 102 when interfaced with the sample 104. In an embodiment, the PiFM controller 126 may also detect the absorption of the electromagnetic radiation by the resonant sensor material 104 by detecting the electromagnetic radiation scattered by the combination of the probe tip, the resonant sensor material, and the sample at the interface of the probe tip and the sample. The details of the scanning probe microscope 100 are described in the U.S. Pat. No. 8,739,311 B2, which is incorporated by reference herein.

PiFM can be used to measure the photo-induced force arising from the absorption of the excitation light by the sample when the excitation wavelength can excite the vibrational or other resonances in the sample. However, if the excitation wavelength cannot excite a particular vibrational resonance in the sample due to either the lack of a source with the right wavelength or due to the fact that the vibration mode is not "IR active," PiFM will not be able to detect any signal at the wavelength. For example, if the sample consists of $SiO_2$ and SiGe, the standard PiFM will be able to identify the $SiO_2$ parts by using the absorption at ~1100 cm$^{-1}$ whereas the SiGe will not be detectable since it has no vibrational mode that is IR active in the range of the typical laser sources used with PiFM.

Figure 2A:
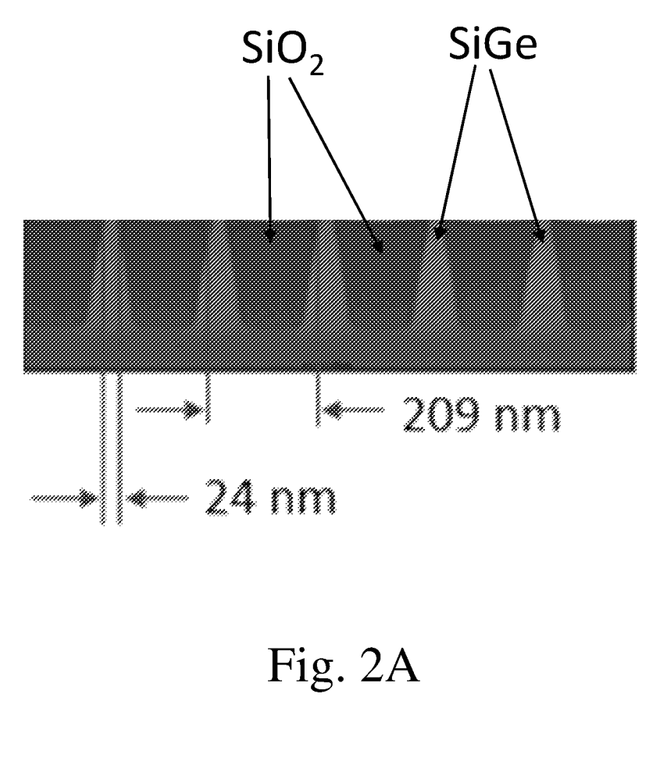
FIG. 2A illustrates a cross-sectional view of a sample where SiGe line is repeated in the matrix of $SiO_2$.
Figure 2B:
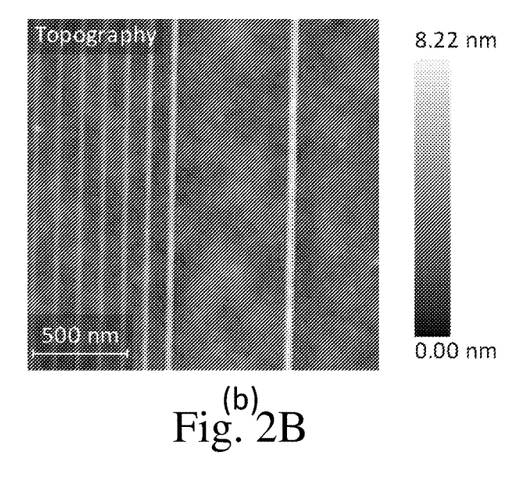
FIG. 2B illustrates AFM topography that shows the SiGe lines in the sample shown in FIG. 2A.
Figure 2C:
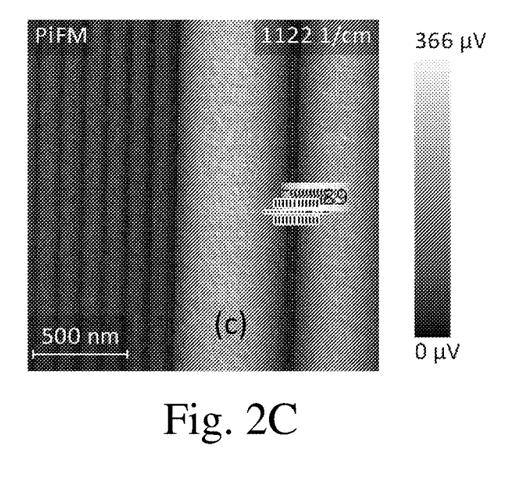
FIG. 2C illustrates PiFM of the sample shown in FIG. 2A that has been measured with a metal coated probe tip.
Figure 2D:
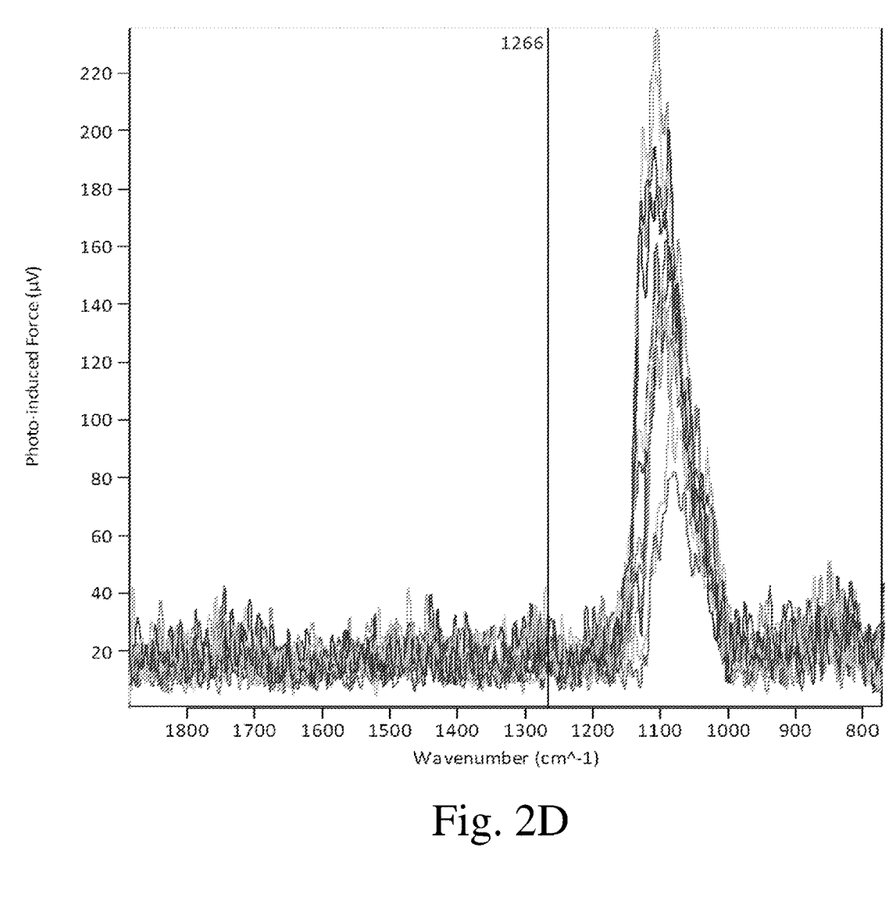
FIG. 2D illustrates PiFM spectra taken across the SiGe lines of the sample shown in FIG. 2A.
Figure 2E:
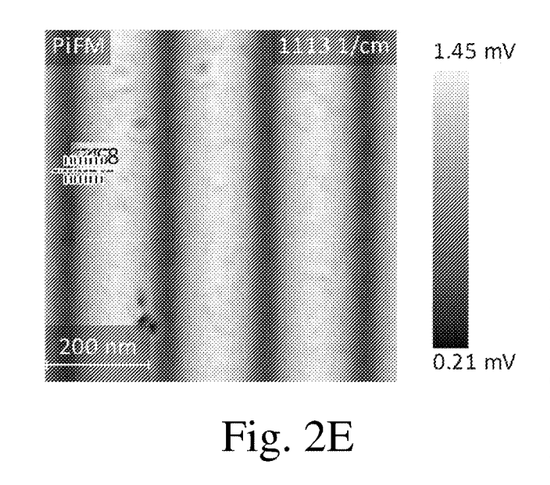
FIG. 2E illustrates PiFM of the sample shown in FIG. 2A that has been measured using a metal probe tip with a thin coating of sensor molecule material, which shows Si—O vibrations around 1100 $cm^{-1}$ when the tip is on top of the SiGe line of the sample shown in FIG. 2A in accordance with an embodiment of the invention.
Figure 2F:
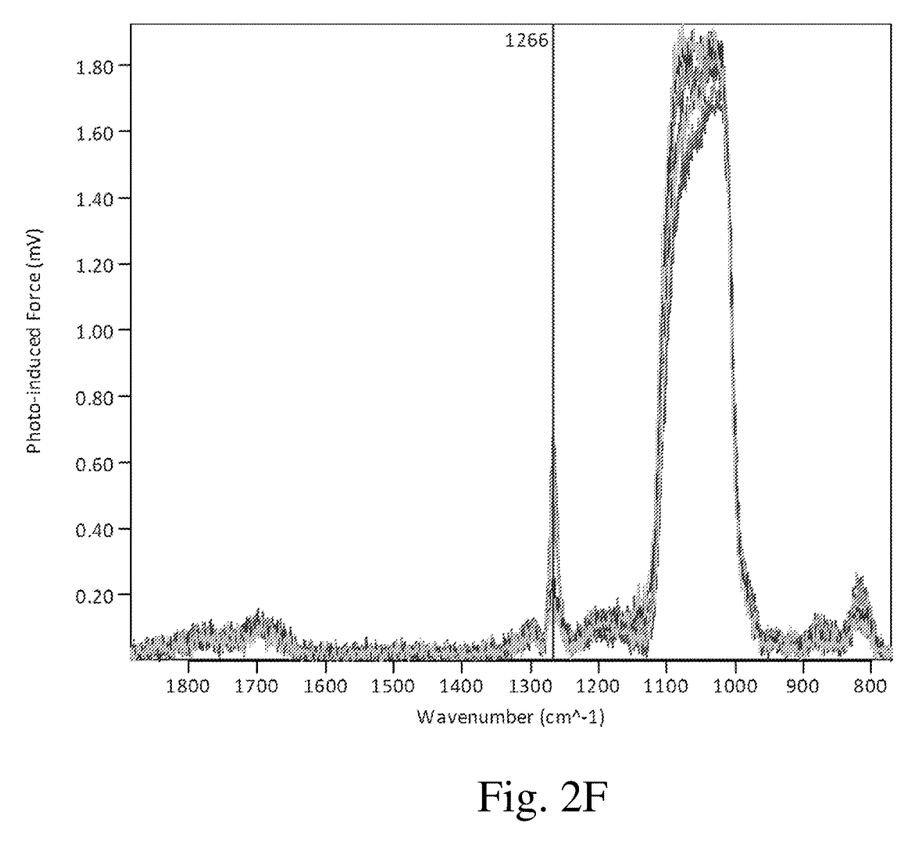
FIG. 2F illustrates PiFM spectra taken using a metal probe tip with a thin coating of sensor molecule material, which shows a sizable PiF signal at 1266 $cm^{-1}$ when the tip is on top of the SiGe line of the sample shown in FIG. 2A in accordance with an embodiment of the invention.
Figure 2G:
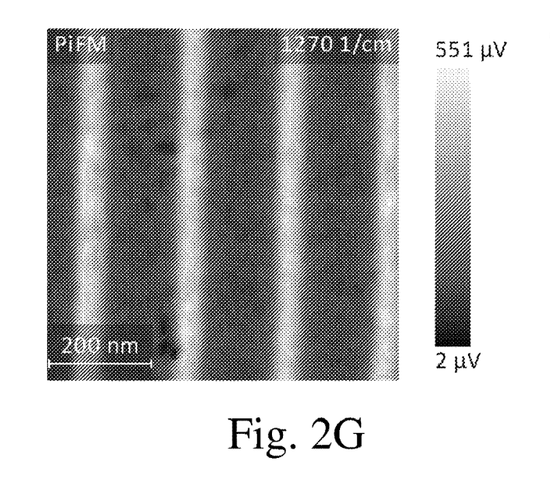
FIG. 2G illustrates PiFM of the sample shown in FIG. 2A that has been measured using a metal probe tip with a thin coating of sensor molecule material, which shows that PiFM image at 1270 $cm^{-1}$ in fact highlights the SiGe lines clearly even though SiGe does not have IR active vibrational mode at 1270 cm$^{-1}$ in accordance with an embodiment of the invention.

FIG. 2A shows a cross-sectional view of a sample where SiGe line is repeated in the matrix of $SiO_2$. As shown in FIG. 2A, adjacent SiGe lines are spaced 209 nm apart and the width of each SiGe line being 24 nm. Since the SiGe lines are slightly taller than the $SiO_2$ matrix, AFM topography clearly shows the SiGe lines, as illustrated in FIG. 2B. When such a sample is measured with a metal coated probe tip in PiFM, the $SiO_2$ matrix cab be very clearly seen at 1120 cm$^{-1}$ with SiGe lines appearing as dark lines, as illustrated in FIG. 2C. Unfortunately, there is no wavelength available in a quantum cascade laser (QCL) to detect the SiGe lines. As such, when PiFM spectra is taken across the SiGe lines, as illustrated in FIG. 2D, it can be seen that there is PiF signal only around 1100 cm-1 from the Si—O vibrations. However, when a metal probe tip with a thin coating of sensor molecule material is used, which has a IR active vibrational peak at 1266 cm$^{-1}$, PiFM spectra show a sizable PiF signal at 1266 cm$^{-1}$ in addition to the Si—O vibrations around 1100 cm$^{-1}$ when the tip is on top of the SiGe line, as illustrated in FIGS. 2E and 2F. With such a probe tip, PiFM image at 1270 cm$^{-1}$ in fact highlights the SiGe lines clearly even though SiGe does not have IR active vibrational mode at 1270 cm$^{-1}$, as illustrated in FIG. 2G. It is because of this ability of the coating to map materials that would otherwise be invisible to IR excitation that this additional coating is called a sensor molecule material.

These results arise from the different field enhancement at the probe tip depending on the dielectric constant of the sample. The higher the dielectric constant, the greater the field enhancement that the sensor molecule material is seeing. The net result is that when the probe tip is on top of a material with higher dielectric constant, the intensity of the excitation light is effectively higher than when the probe tip is on top of a material with lower dielectric constant.

Figure 3:
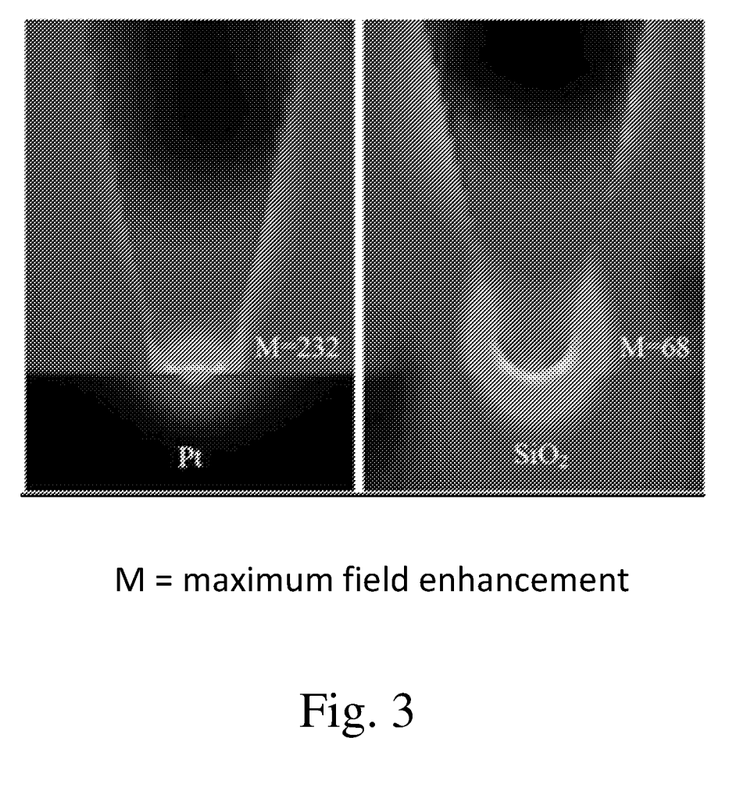
FIG. 3 shows schematically the different electric fields when the probe tip is on top of materials with different dielectric constants.
Figure 4:
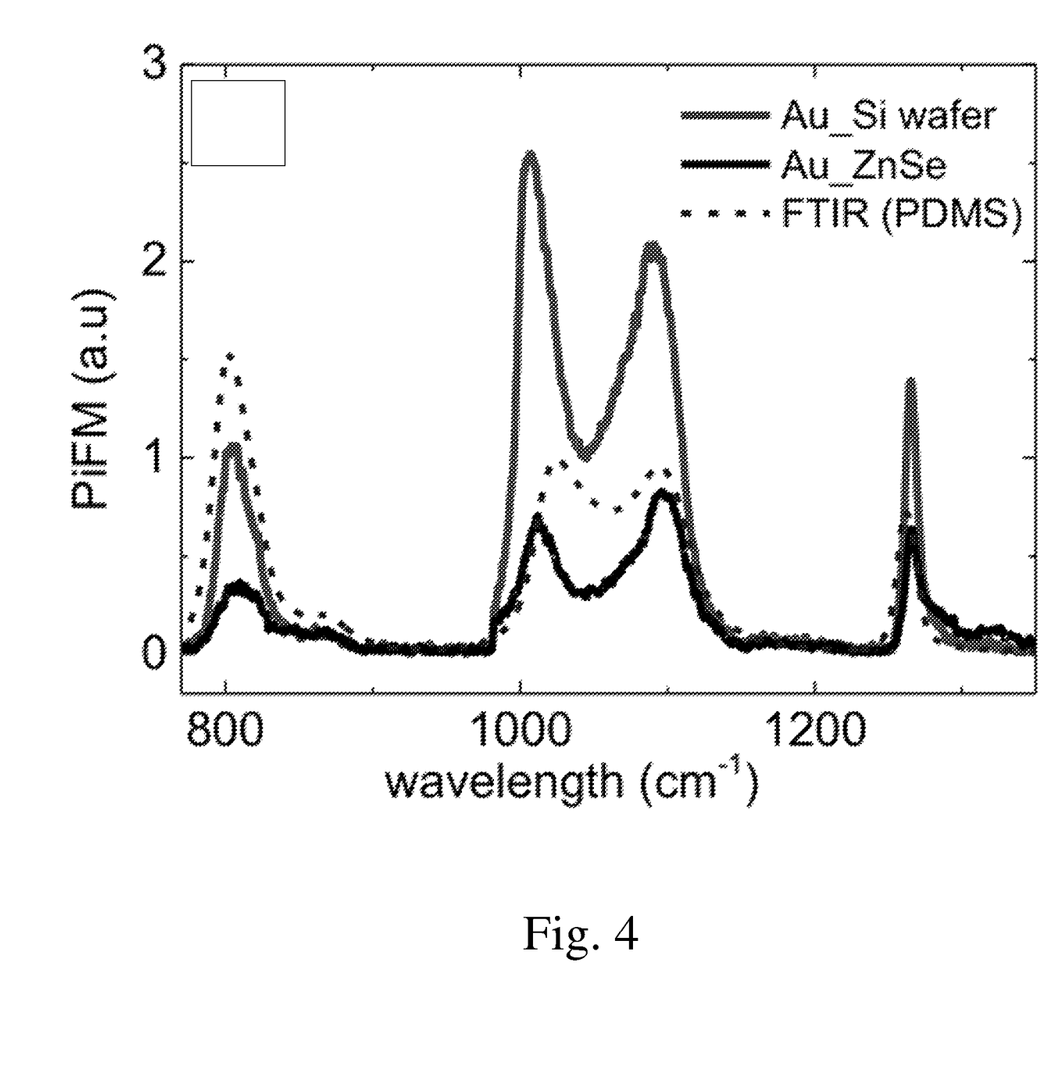
FIG. 4 shows the sensor material's IR spectrum and what PiFM spectra would report when the probe tip is on top of materials with varying dielectric constant in accordance with an embodiment of the invention.

FIG. 3 shows schematically the different electric fields when the probe tip is on top of materials with different dielectric constants. When the probe tip is on top of platinum (Pt), the maximum field enhancement is M=232. However, when the probe tip is on top of $SiO_2$, the maximum field enhancement is M=68. Therefore, the sensor molecule material's response at its own IR active vibrational modes will respond with more intensely when it is over the material with higher dielectric constant. This allows PiFM to be able to generate material dependent contrast even when the sample contains components that are not IR active. FIG. 4 shows the sensor material's IR spectrum and what PiFM spectra would report when the probe tip is on top of materials with varying dielectric constant.

Figure 5A:
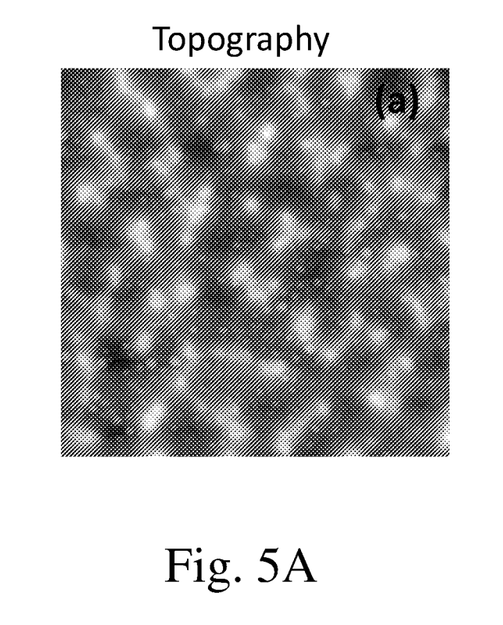
FIG. 5A shows an image of silver nanowires buried within a polymer produced via topography in accordance with an embodiment of the invention.
Figure 5B:
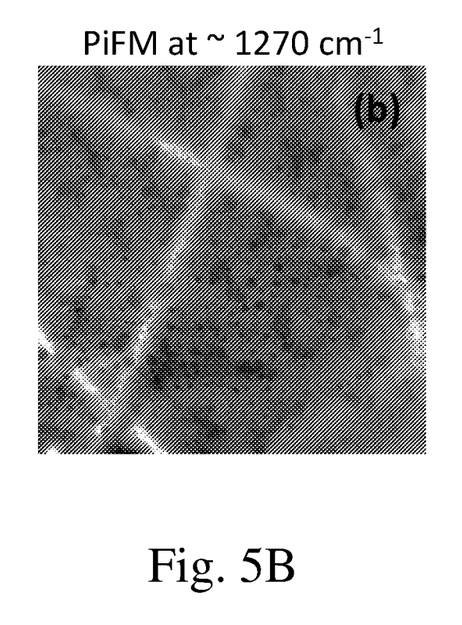
FIG. 5B shows an image of silver nanowires buried within a polymer produced via PiFM in accordance with an embodiment of the invention.

Since light can penetrate non-metallic materials significantly, it turns out that a presence of metal buried within non-metal can affect the field enhancement as well. Therefore, one should be able to image buried structures as well by using a sensor molecule's vibrational modes. FIGS. 5A and 5B show just such an image where silver nanowires buried within a polymer is effectively imaged at one of sensor material's vibrational mode. FIG. 5A shows an image produced via topography. FIG. 5B shows an image produced via PiFM.

AFM probe tips with sensor material can be prepared in a variety of methods. One approach is to place the probe tip in an environment where the sensor material is present as a vapor, and to rely on condensation from vapor to coat the probe tip. A practical example of this is to place the probe tip in a small enclosure containing the polymeric elastomer material PDMS (polydimethylsiloxane). Typically, after some days of exposure to this environment, a nanoscopic layer of siloxane-containing material forms on the probe tip and can function as a sensor material. A variation on this technique is to place the probe tip in an evaporator (a vacuum enclosure in which a vial of sensor material is heated to evaporate it); the evaporated material travels through the vacuum and deposits on the probe tip. Another approach is to create a self-assembled monolayer of material on a tip by placing the probe tip in a liquid containing appropriate species needed for the self-assembly of a monolayer of a target sensor material. Methods of producing self-assembled organic layers are widely reported in scientific literature. Another approach to creating a thin layer of sensor material is dip coating, in which the probe tip is dipped into a solution containing a specific concentration of sensor material in a solvent. Upon removing the tip from the solution, the solvent evaporates, leaving behind a coating of sensor material.

In an embodiment, the sensor material 104 used on the metallic probe tip 102 has an absorption resonance within the wavelength range of the tunable laser 110. The absorption resonance of the sensor material 104 may be within the infrared or visible light range of wavelengths. In an embodiment, the sensor material 104 may be a thin film of material, which may be self-assembled monolayer of material, adhering to at least the apex of the metallic probe tip 102. In some embodiments, the sensor material 104 may be a particle of a cluster of molecules not thicker than 50 nm in the direction parallel to the axis of the tip. As used herein, "particle" simply means a small amount of material, anything from a single molecule up to a particle that can be seen by the naked eye (fraction of a mm). Also, as used herein, "direction parallel to the axis of the tip" refers generally to the vertical direction along the length of the probe tip, i.e., normal to the surface of the XYZ sample scanner 120 facing the probe tip. Also, as used herein, "near the apex of the tip" means that it is within the range of generating a PiFM force between the tip and a sample, which would generally be up to several tens of nm and as much as one hundred nm. As noted above, the sensor material 104 used on the metallic probe tip 102 may be a siloxane-containing material having at least one absorption resonance that can be produced by the electromagnetic radiation generate by the tunable laser 110.

Figure 6:
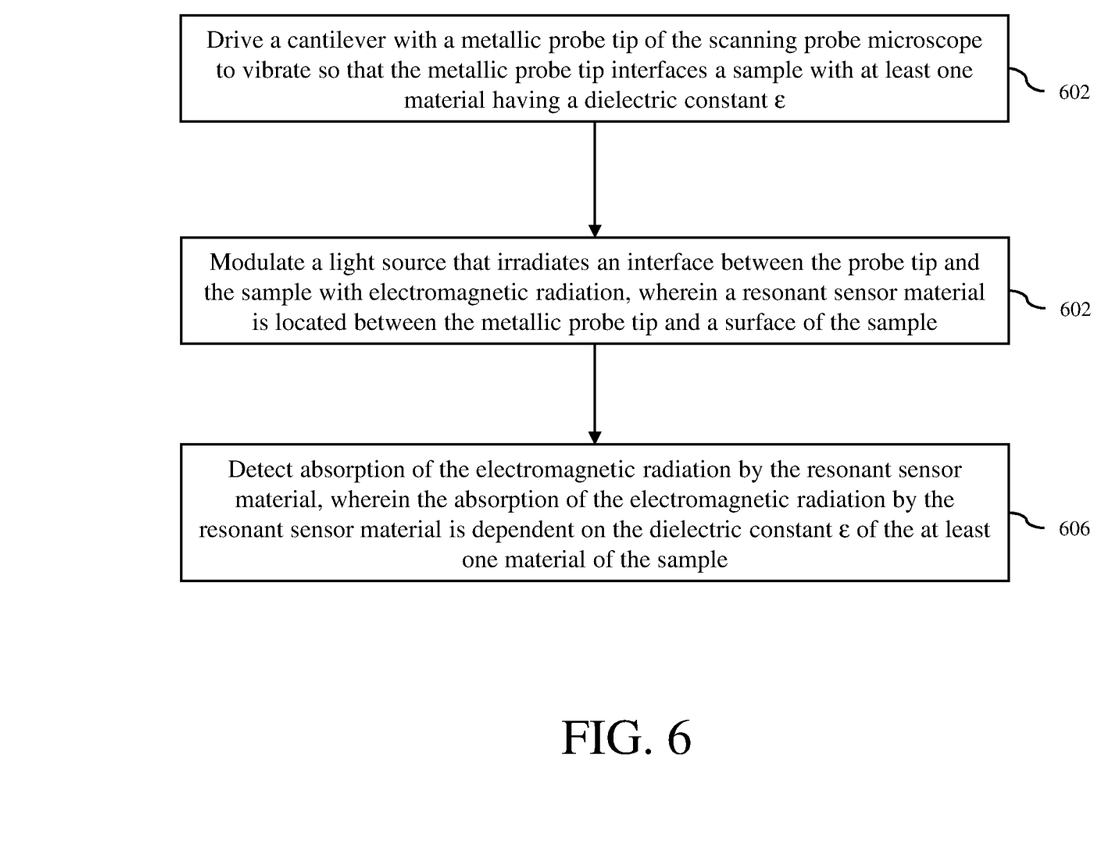
FIG. 6 is a process flow diagram of a method of operating a scanning probe microscope in accordance with an embodiment of the invention.

A method of operating a scanning probe microscope, such as the scanning probe microscope 100, in accordance with an embodiment of the invention is described with reference to a flow diagram of FIG. 6. At block 602, a cantilever with a metallic probe tip of the scanning probe microscope is driven to vibrate so that the metallic probe tip interfaces a sample with at least one material having a dielectric constant ε. At block 604, a light source that irradiates an interface between the probe tip and the sample with electromagnetic radiation is modulated, where a resonant sensor material is located between the metallic probe tip and a surface of the sample. At block 606, absorption of the electromagnetic radiation by the resonant sensor material, wherein the absorption of the electromagnetic radiation by the resonant sensor material is dependent on the dielectric constant ε of the at least one material of the sample.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A scanning probe microscope comprising:
a cantilever with a metallic probe tip to interface a sample with at least one material having a dielectric constant $\varepsilon$;
a light source to transmit electromagnetic radiation to an interface between the metallic probe tip and the sample;
a vibration drive device coupled to the cantilever that vibrates the cantilever;
a resonant sensor material between the metallic probe tip and a surface of the sample; and
a detection system to detect absorption of the electromagnetic radiation by the resonant sensor material, wherein the absorption of the electromagnetic radiation by the resonant sensor material is dependent on the dielectric constant $\varepsilon$ of the at least one material of the sample.

2. The scanning probe microscope of claim 1, wherein the detection system detects the absorption of the electromagnetic radiation by the resonant sensor material by measuring photo-induced forces or force gradients acting on the probe tip when interfaced with the sample.

3. The scanning probe microscope of claim 1, wherein the detection system detects the absorption of the electromagnetic radiation by the resonant sensor material by detecting the electromagnetic radiation scattered by the combination of the probe tip, the resonant sensor material, and the sample at the interface of the probe tip and the sample.

4. The scanning probe microscope of claim 1, wherein the light source includes a tunable laser, and the resonant sensor material has an absorption resonance within the wavelength range of the tunable laser.

5. The scanning probe microscope of claim 1, wherein the resonant sensor material is attached to the probe tip.

6. The scanning probe microscope of claim 5, wherein the light source includes a tunable laser, and the resonant sensor material has an absorption resonance within the wavelength range of the tunable laser.

7. The scanning probe microscope of claim 5, wherein the resonant sensor material includes a thin film of material adhering to at least the apex of the probe tip.

8. The scanning probe microscope of claim 5, wherein the resonant sensor material includes self-assembled monolayer of material adhering to at least the apex of the probe tip.

9. The scanning probe microscope of claim 5, wherein the resonant sensor material is not thicker than 50 nm in the direction parallel to the axis of the probe tip along the length of the probe tip.

10. The scanning probe microscope of claim 5, wherein the resonant sensor material includes a siloxane-containing material, and the electromagnetic radiation from the light source can produce at least one absorption resonance of the siloxane-containing material.

11. The scanning probe microscope of claim 1, wherein the resonant sensor material is attached to the sample.

12. The scanning probe microscope of claim 1, wherein an absorption resonance of the resonant sensor material is within the infrared or visible light range of wavelengths.

13. A method of operating a scanning probe microscope comprising:
   driving a cantilever with a metallic probe tip of the scanning probe microscope to vibrate so that the metallic probe tip interfaces a sample with at least one material having a dielectric constant $\varepsilon$;
   modulating a light source that irradiates an interface between the probe tip and the sample with electromagnetic radiation, wherein a resonant sensor material is located between the metallic probe tip and a surface of the sample; and
   detecting absorption of the electromagnetic radiation by the resonant sensor material, wherein the absorption of the electromagnetic radiation by the resonant sensor material is dependent on the dielectric constant $\varepsilon$ of the at least one material of the sample.

14. The method of 13, wherein detecting the absorption of the electromagnetic radiation includes measuring photo-induced forces or force gradients acting on the probe tip when interfaced with the sample.

15. The method of 13, wherein detecting the absorption of the electromagnetic radiation includes detecting the electromagnetic radiation scattered by the combination of the probe tip, the resonant sensor material, and the sample at the interface of the probe tip and the sample.

16. The method of 13, wherein modulating the light source includes modulating a tunable laser, and wherein the resonant sensor material has an absorption resonance within the wavelength range of the tunable laser.

17. The method of 13, wherein the resonant sensor material is attached to the probe tip.

18. The method of 17, wherein the resonant sensor material includes self-assembled monolayer of material adhering to at least the apex of the probe tip.

19. The method of 17, wherein the resonant sensor material includes a siloxane-containing material, and wherein modulating the light source includes modulating the light source such that the electromagnetic radiation is generated with a wavelength range that can produce at least one absorption resonance of the siloxane-containing material.

20. The method of claim 13, further comprising coating the sample with the resonant sensor material.

* * * * *